(12) United States Patent
Jang

(10) Patent No.: US 11,128,128 B2
(45) Date of Patent: Sep. 21, 2021

(54) DIRECTIONAL OVER-CURRENT GROUND RELAY (DOCGR) USING SAMPLED VALUE AND METHOD FOR OPERATING THE DOCGR

(71) Applicant: LSIS CO., LTD., Anyang-si (KR)

(72) Inventor: Su-Hyeong Jang, Anyang-si (KR)

(73) Assignee: LSIS CO., LTD., Anyang-si (KR)

( * ) Notice: Subject to any disclaimer, the term of this patent is extended or adjusted under 35 U.S.C. 154(b) by 552 days.

(21) Appl. No.: 16/111,879

(22) Filed: Aug. 24, 2018

(65) Prior Publication Data
US 2019/0348832 A1 Nov. 14, 2019

(30) Foreign Application Priority Data
May 8, 2018 (KR) .................. 10-2018-0052278

(51) Int. Cl.
*H02H 7/26* (2006.01)
*H02H 1/00* (2006.01)

(52) U.S. Cl.
CPC .......... *H02H 7/263* (2013.01); *H02H 1/0007* (2013.01); *H02H 1/0069* (2013.01); *H02H 1/0092* (2013.01)

(58) Field of Classification Search
CPC .. H02H 1/0007; H02H 1/0069; H02H 1/0092; H02H 3/08; H02H 3/081; H02H 7/263; H02H 7/28; H02H 7/26; H02H 3/38; Y04S 10/00; Y04S 10/18; Y04S 10/20; Y04S 10/50; Y04S 10/52; Y04S 10/522; G01R 31/086; G01R 31/088; H02J 13/00
See application file for complete search history.

(56) References Cited

U.S. PATENT DOCUMENTS

| 9,178,350 B2* | 11/2015 | Yan | H02H 7/261 |
| 2009/0086388 A1* | 4/2009 | Shin | H02H 3/081 |
| | | | 361/42 |
| 2010/0097736 A1* | 4/2010 | Apostolov | H02H 3/38 |
| | | | 361/79 |
| 2011/0211371 A1* | 9/2011 | Taneja | H02M 3/33538 |
| | | | 363/21.05 |

FOREIGN PATENT DOCUMENTS

| CN | 101515715 A | 8/2009 |
| CN | 101515716 A | 8/2009 |
| CN | 101552461 A | 10/2009 |

(Continued)

OTHER PUBLICATIONS

Chinese Office Action for related Chinese Application No. 201810972006.3; action dated Jan. 29, 2021; (7 pages).

*Primary Examiner* — Jared Fureman
*Assistant Examiner* — Nicolas Bellido
(74) *Attorney, Agent, or Firm* — K&L Gates LLP

(57) ABSTRACT

The present disclosure relates to a directional over-current ground relay (DOCGR) for performing a protective relay of the power source system such as a micro-grid system using communications between an SV-remote terminal unit (SV-RTU) and the DOCGR, wherein the SV-RTU is configured for measuring voltage and current of the distributed power source system and thus generating a sampled value (SV) signal. Further, the present disclosure relates to a method for operating the DOCGR.

11 Claims, 5 Drawing Sheets

(56) References Cited

FOREIGN PATENT DOCUMENTS

| | | | |
|---|---|---|---|
| CN | 102882197 A | | 1/2013 |
| CN | 103094888 A | | 5/2013 |
| CN | 103354355 A | | 10/2013 |
| CN | 103390887 A | * | 11/2013 |
| CN | 104578013 A | | 4/2015 |
| EP | 2829887 A1 | | 1/2015 |
| JP | 2013162614 A | | 8/2013 |
| KR | 20100018817 A | | 2/2010 |
| KR | 20130031583 A | * | 3/2013 |

* cited by examiner

DIRECTIONAL OVER-CURRENT GROUND RELAY (DOCGR) USING SAMPLED VALUE AND METHOD FOR OPERATING THE DOCGR

CROSS-REFERENCE TO RELATED APPLICATIONS

Pursuant to 35 U.S.C. § 119(a), this application claims the benefit of earlier filing date and right of priority to Korean Application No. 10-2018-0052278 filed on May 8, 2018, in the Korean Intellectual Property Office, the disclosure of which is hereby incorporated by reference in its entirety.

BACKGROUND

1. Technical Field

The present disclosure relates a directional over-current ground relay (DOCGR) for protection of a distributed power source system such as an AC electric circuit, especially a micro-grid, and a method for operating the DOCGR. More particularly, the present disclosure relates to a directional over-current ground relay (DOCGR) for performing a protective relay of the power source system such as a micro-grid system using communications between an SV-remote terminal unit (SV-RTU) and the DOCGR, wherein the SV-RTU is configured for measuring voltage and current of the distributed power source system and thus generating a sampled value (SV) signal. Further, the present disclosure relates to a method for operating the DOCGR.

2. Description of the Related Art

As a solution to environmental and energy problems, a variety of distributed power sources including renewable energy sources have been introduced. In this connection, demand and capacity of the distributed power sources are increasing rapidly.

For example, the distributed power sources may include photovoltaic power generation or wind power generation source utilizing renewable energy. However, in the photovoltaic power generation or wind power generation source, a power generation amount is sensitive to weather states. Further, production and demand of electricity varies over time.

Therefore, in order to maximize the operation efficiency of such a distributed power source, it is necessary that the distributed power source should be connected to a power-distribution system together with the installation of an energy storage facility. In this connection, a small power supply network that has the energy storage facility and is connected to the power-distribution system to efficiently supply power from the distributed power source to a load is referred to as a micro-grid.

Among power consumers, there are power consumers who have the ability to supply power using their own power generation facilities over the power supply network. However, in the conventional power supply network, the consumer with the self-generation function is only self-sufficient and does not contribute to the power supply of the entire network. To solve this problem, the micro-grid emerges as a technology and power generation/consumption model to maximize the energy utilization of the entire network by utilizing the electric energy generated from the consumer having the self-power generation scattered in the power supply network.

Unlike the conventional power source systems, the distributed power source system in form of the micro-grid has multiple power sources. In this case, when a failure occurs in the load or the line, flow of current becomes very complicated, resulting in malfunction or incorrect non-tripping of the intelligent electronic device (IED).

FIG. 1 shows a configuration of a distributed power source system with a conventional intelligent electronic device.

As shown in FIG. 1, the distributed power source system includes a power supply 10 that supplies commercial power, a distributed generation (DG) 20 which supplies power in a form of renewable energy, including individual wind power generation and solar power generation, a first load 30a and a second load 30b consuming power supplied from the power supply 10 and the distributed generation 20, and a first intelligent electronic device 40a and second intelligent electronic device 40b disposed between the power supply 10 and the distributed generation (DG) 20 to trip a circuit breaker (CB) to perform a turn-off operation and shut off a faulty section in the event of a short circuit or ground fault in an electric line to a corresponding load.

Although FIG. 1 shows the configuration in which the two loads are connected to the power supply 10, this is only an example for ease of illustration. The number of the loads is not limited to two.

If the power supply to the load is not smooth due to a power outage in the power supply 10 for supplying commercial power, the distributed generation (DG) 20 may independently power the first load 30a. In this connection, the first and second loads 30a and 30b may establish selective connection with the distributed generation (DG) 20, depending on a predetermined importance level thereof.

In addition, the first intelligent electronic device 40a and the second intelligent electronic device 40b detect a faulty-current caused by a short circuit or grounding of the electric line, and in response, trip the circuit breaker (CB) to turn off.

Referring to FIG. 1, if a faulty-current is detected in the first intelligent electronic device 40a due to a short-circuit or ground fault in the electric line to the first load 30a, the first intelligent electronic device 40a trips the circuit breaker (CB) to perform the turn off operation. This causes the first load 30a connected to the corresponding electric line and the power supply 10 to be disconnected from each other.

Alternatively, if a faulty-current is detected in the second intelligent electronic device 40b due to a short-circuit, or ground fault in the electric line to the second load 30b, the second intelligent electronic device 40b trips the circuit breaker (CB) to perform a turn-off operation. This causes the second load 30b connected to the corresponding electric line and the power supply 10 to disconnect each other.

As described above, the intelligent electronic device is installed for each corresponding electric line, and performs the trip operation of the circuit breaker against a faulty-current event.

However, as mentioned above, the distributed power source system configured as described above has a plurality of power sources unlike the conventional power source system. Therefore, there is a problem that the under-reach occurs and, thus, malfunction or incorrect non-tripping of the intelligent electronic device (IED) occurs. For reference, the under-reach refers to the phenomenon that a value of the faulty-current as supplied by the power supply becomes smaller than an original value thereof due to the distributed power source. As a result, an operation range of the intelligent electronic device is below a setting range. For example, the under-reach occurs in a transmission line of a multi-terminals power source. Thus, an impedance experienced by the intelligent electronic device is greater than an impedance to an actual fault point. Therefore, even though the fault point falls within the operation range in terms of a distance, the intelligent electronic device IDE may incorrectly non-trip.

FIG. 2 is a configuration diagram illustrating the problem occurring in the distributed power source system with the conventional intelligent electronic device in FIG. 1.

Referring to FIG. 2, when short-circuit or ground fault occurs in the electric line to the first load 30a, a faulty-current $I_{source\_Flt}$ is generated in the corresponding electric line.

In this connection, the faulty-current $I_{source\_Flt}$ generated in the electric line must have a current value (for example, 100 A) as supplied by the power supply 10. However, the under-reach may occur by generated-current $I_{DG\_Flt}$ as supplied by the distributed generation (DG) 20 due to the distributed power source. This causes a current with a value (e.g., 70 A) smaller than an original value of the faulty-current $I_{source\_Flt}$ to flow.

As described above, the under-reach may cause flow of a current having a value lower than the faulty-current referenced for detecting the absence or presence of the fault in the electric line. As such, the first intelligent electronic device 40a may not accurately detect the absence or presence of a fault in the electric line. This may lead to a problem that incorrect non-tripping occurs.

To overcome this problem, there is disclosed a method of checking absence or presence of a fault in another electric line using communications between the intelligent electronic devices.

However, in the scheme that uses the communication between the intelligent electronic devices, there arises a problem of increasing signal processing as response signals are exchanged between the devices. Further, a communication network between the intelligent electronic devices may be disabled due to a fault in a communication line. In this case, an associated intelligent electronic device may stop.

SUMMARY

The present disclosure is designed to solve the above problem. Thus, the present disclosure has a purpose to provide a directional over-current ground relay (DOCGR) for performing a protective relay of the power source system such as a micro-grid system using communications between an SV-remote terminal unit (SV-RTU) and the DOCGR, wherein the SV-RTU is configured for measuring voltage and current of the distributed power source system and thus generating a sampled value (SV) signal. Further, the present disclosure has another purpose to provide a method for operating the DOCGR.

The purposes of the present disclosure are not limited to the above-mentioned purposes. Other purposes and advantages of the present disclosure, as not mentioned above, may be understood from the following descriptions and more clearly understood from the embodiments of the present disclosure. Further, it will be readily appreciated that the objects and advantages of the present disclosure may be realized by features and combinations thereof as disclosed in the claims.

In one aspect of the present disclosure, there is provided a distributed power source system comprising: a power supply for supplying power; a distributed generation (DG) for supplying generated-power using distributed power sources connected to a power grid; a plurality of loads for consuming power supplied from the power supply and the distributed generation (DG); a plurality of directional over-current ground relays (DOCGRs) provided between the power supply and the distributed generation (DG) and using a sampled value (SV) signal, wherein each of the plurality of directional over-current ground relays (DOCGRs) trips a corresponding circuit breaker (CB) to isolate a faulty section in an event of a short-circuit or ground fault in a load-connected electric line connected thereto; and a SV-remote terminal unit (SV-RTU) for detecting a current in a load-connected electric line located between the power supply and the distributed generation (DG) and for transmitting, to the directional over-current ground relays (DOCGRs), the detected current value and information about a location of the loaded-connected electric line.

In one implementation of the distributed power source system, the SV-remote terminal unit (SV-RTU) transmits the SV signal to the directional over-current ground relays (DOCGRs) using optical communication.

In one implementation of the distributed power source system, at least one SV-remote terminal unit (SV-RTU) is disposed between the plurality of loads and a plurality of directional over-current ground relays (DOCGR), wherein the SV-RTU detects a value of current flowing in a corresponding electric line connected thereto, and generates the SV signal including the detected current value and information about a location of the corresponding electric line, and delivers the SV signal to all of the directional over-current ground relays (DOCGRs).

In one implementation of the distributed power source system, the SV-remote terminal unit detects a current in a location of the corresponding electric line located downstream a node where power supplied by the power supply and power supplied by the distributed generation (DG) are merged with each other.

In one implementation of the distributed power source system, each of the directional over-current ground relays (DOCGRs) includes: an analog to digital converter (ADC) for converting, to a digital signal, a voltage value and current value measured at the corresponding electric-line; a sampled value (SV) receiver 402 for receiving the SV signal from the SV-remote terminal unit (SV-RTU); a signal processor for performing a directional over-current ground relay (DOCGR) operation based on the digital signal converted from the ADC and the SV signal received from the SV-remote terminal unit (SV-RTU) and for detecting a fault direction in the corresponding electric line; and a circuit breaker controller for detecting a to-be-protected area based on the detected fault direction in the electric line detected by the signal processor and for controlling a circuit breaker located in the to-be-protected area.

In one implementation of the distributed power source system, the fault direction in the electric line is detected such that a measured location of the electric line is directed to the connected load when the location of the line indicated by the SV signal is associated with a location of a corresponding directional over-current ground relay (DOCGR).

In another aspect of the present disclosure, there is provided a method for operating a directional over-current ground relay (DOCGR) using a sampled value, the method comprising: (a) acquiring voltage and current data of a load-connected electric line to the DOCGR, and receiving a sampled value (SV) signal including current data and location information of the line detected by a SV-RTU; (b) using a signal processor to perform a DOCGR (Directional Over-current Ground Relay) operation based on the acquired voltage and current data (Main CT) of the electric line and the SV signal (aux CT); (c) when it is determined from a calculation result by the processor based on the acquired voltage and current data (Main CT) of the electric line that the electric line is in a fault state, determining a calculation result by the processor based on the SV signal (aux CT); (d) when it is determined from the calculation result by the processor based on the SV signal (for aux CT) that the electric line corresponding to the SV signal is in a fault state, determining a fault direction of the line; (e) when it is determined from the fault direction determination result that the fault direction is directed to the electric-line, using a circuit breaker controller to trip a circuit breaker; and (f) when it is determined from the fault direction determination result that the fault direction is directed to another electric line, determining that a fault does not occur in an area to be protected by the directional over-current ground relay (DOCGR).

In one implementation of the method, in (a), the SV-remote terminal unit detects a current in a location of the electric line located downstream a node where power supplied by a power supply and power supplied by a distributed generation (DG) are merged with each other.

In one implementation of the method, the method further comprises: when it is determined from the calculation result by the processor based on the SV signal (aux CT) that the electric line corresponding to the SV signal is in the normal state, determining that no fault occurs in the area to be protected by the directional over-current ground relay (DOCGR).

In one implementation of the method, in (d), the fault direction in the electric line is detected such that a measured location of the electric line is directed to the connected load when the location of the line indicated by the SV signal is associated with a location of a corresponding directional over-current ground relay (DOCGR).

In one implementation of the method, (f) includes controlling a directional over-current ground relay (DOCGR) connected to an electric line opposite the load to which the fault direction is directed to trip a corresponding circuit breaker to perform a turn-off operation thereof.

According to the present disclosure, in an AC grid (microgrid) system to which the distributed power sources are connected, the adverse effects of the under-reach may be eliminated. This prevents the directional over-current ground relay (DOCGR) from malfunctioning or incorrectly non-tripping, effectively protecting the distributed power source system.

Further, according to the present disclosure, it is possible to check the absence or presence of a fault in the opposite electric line without communication between the directional over-current ground relays (DOCGRs). This may prevent the malfunction of the directional over-current ground relay (DOCGR) or the occurrence of incorrect non-tripping of the DOCGR. Further, a fast and accurate protection relay is achieved.

In addition to the effects as described above, specific effects of the present disclosure are described together with specific details for carrying out the present disclosure.

DETAILED DESCRIPTION

Figure 1:
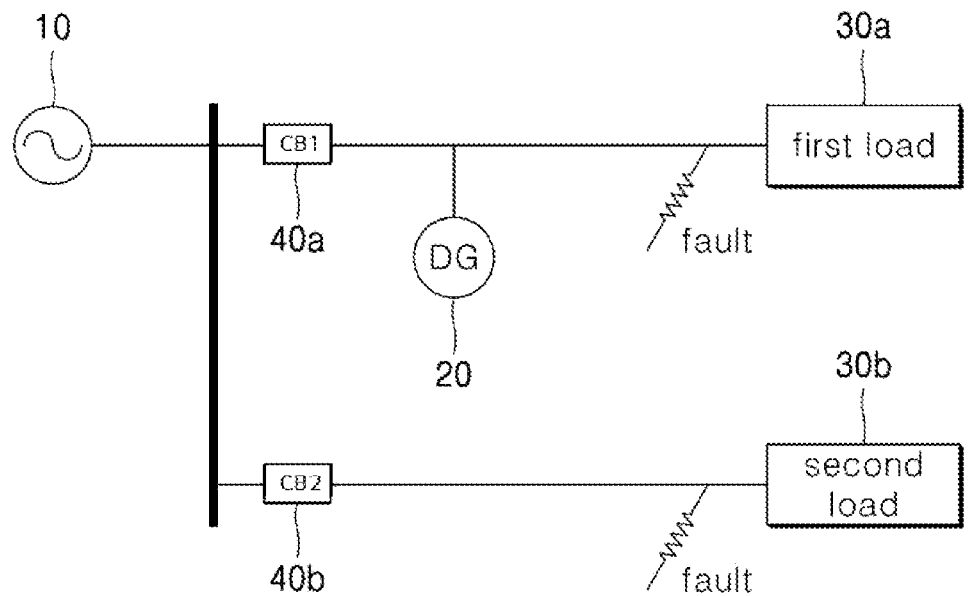
FIG. 1 shows a configuration diagram of a distributed power source system with a conventional intelligent electronic device.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The same reference numbers in different figures denote the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

The terminology used herein is for describing particular embodiments only and is not intended to be limiting of the present disclosure. As used herein, the singular forms "a" and "an" are intended to include the plural forms as well, unless the context clearly indicates otherwise. It will be further understood that the terms "comprise", "comprising", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a directional over-current ground relay (DOCGR) using a sampled value (SV) and a method for operating the DOCGR according to a preferred embodiment of the present disclosure will be described in detail with reference to the accompanying drawings.

Figure 3:
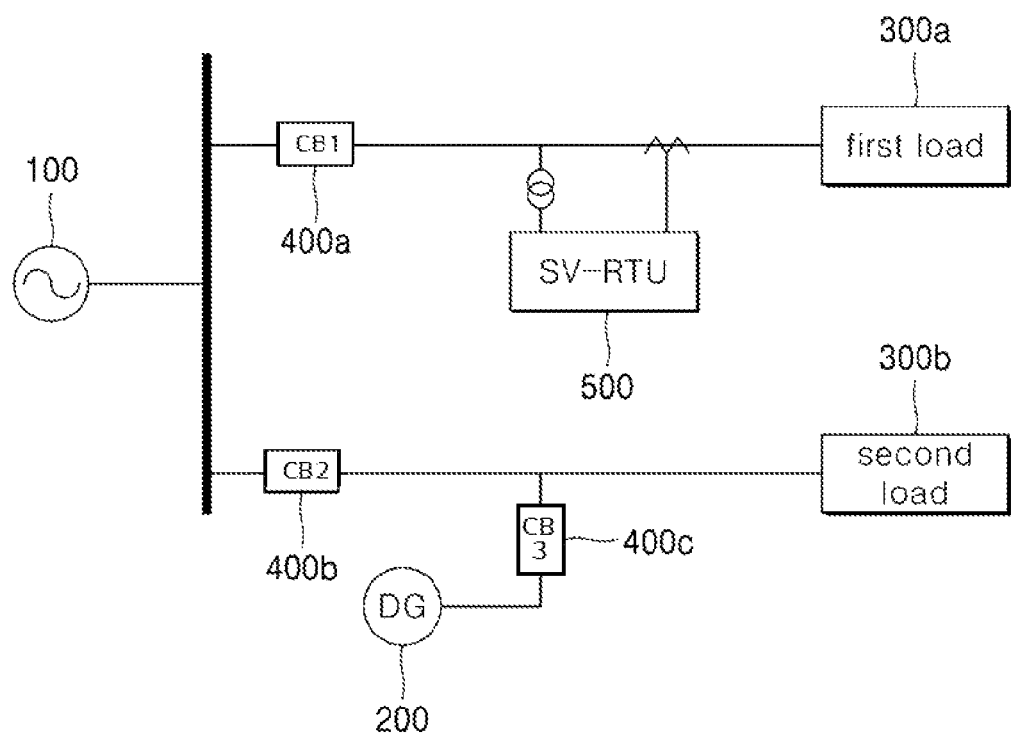
FIG. 3 is a configuration diagram showing a configuration of a distributed power source system having a directional over-current ground relay (DOCGR) using a sampled value (SV) according to one embodiment of the present disclosure.

FIG. 3 is a configuration diagram showing a configuration of a distributed power source system having a directional over-current ground relay (DOCGR) using a sampled value (SV) according to one embodiment of the present disclosure. The configuration of the distributed power source system having the directional over-current ground relay (DOCGR) shown in FIG. 3 is merely an example. Thus, the components of the distributed power source system having the directional over-current ground relay (DOCGR) are not limited to the embodiment shown in FIG. 3. Some components may be added, changed or deleted as needed.

As shown in FIG. 3, the distributed power source system having the directional over-current ground relay (DOCGR) according to one embodiment of the present disclosure includes a power supply 100 for providing commercial power; a distributed generation (DG) 200 which supplies power in a form of renewable energy, including individual wind power generation and solar power generation; a first load 300a and a second load 300b consuming power supplied from the power supply 100 and the distributed generation 200; and a first directional over-current ground relay (DOCGR) 400a, a second directional over-current ground relay (DOCGR) 400b, and a third directional over-current ground relay (DOCGR) 400b disposed between the power supply 100 and the distributed generation (DG) 200 to trip a circuit breaker (CB) to perform a turn-off operation and shut off a faulty section in the event of a short circuit or ground fault in an electric line to a corresponding load. The distributed power source system having the directional over-current ground relay (DOCGR) according to one embodiment of the present disclosure further includes a SV-remote terminal unit (SV-RTU) 500 configured for detecting a current value of a load-connected electric line located between the power supply 100 and the distributed generation (DG) 200 and for transmitting the detected current value and information about a location of the electric line to the first directional over-current ground relay (DOCGR) 400a, the second directional over-current ground relay (DOCGR) 400b, and the third directional over-current ground relay (DOCGR) 400c.

In this connection, the SV-remote terminal unit (SV-RTU) 500 may transmit the SV signal to the directional over-current ground relay (DOCGR) using optical communication.

Although FIG. 3 shows the configuration in which the two loads are connected to the power supply 100, this is only an example for ease of illustration. The number of the loads is not limited to two. Further, the number and positions of the SV-RTU 500 and the directional over-current ground relays (DOCGRs) are not limited to the embodiment shown in FIG. 3. The SV-RTU 500 and the directional over-current ground relay (DOCGR) may be located at desired locations within the system by an operator.

At least one SV-remote terminal unit (SV-RTU) 500 may be disposed between a plurality of loads and a plurality of the directional over-current ground relays (DOCGRs), and may detect a value of a current flowing in a corresponding electric line. The SV-remote terminal unit (SV-RTU) 500 generates a sampled value (SV) signal including the detected current value and information about a location of the corresponding electric line, and transmits the generated signal to all of the directional over-current ground relays (DOCGRs).

Figure 2:
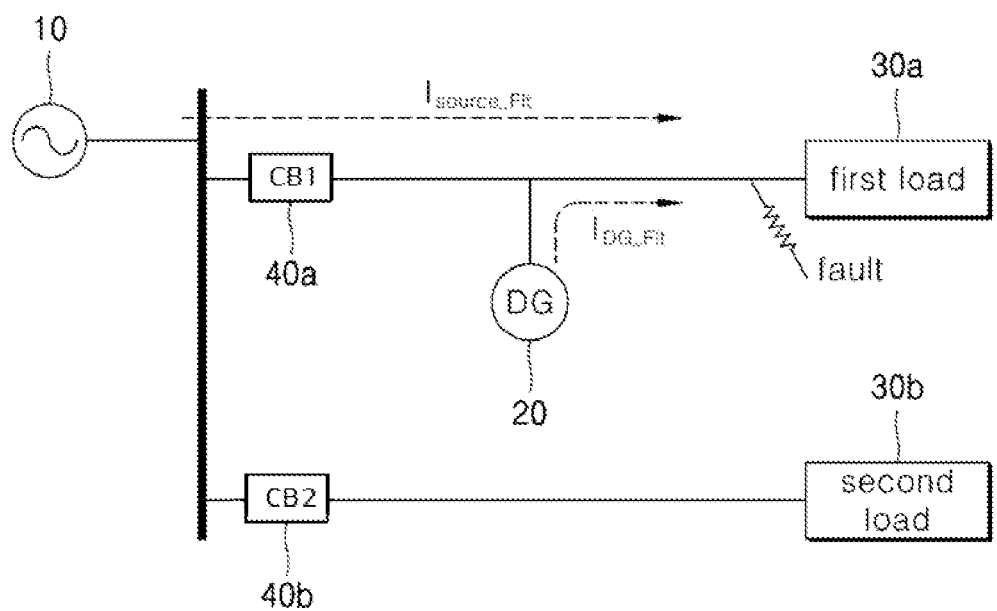
FIG. 2 is a configuration diagram to illustrate the problem encountered in the distributed power source system with the conventional intelligent electronic device.

However, the SV-remote terminal unit (SV-RTU) 500 must determine the absence or presence of a fault based on the current value detected by the SV-remote terminal unit (SV-RTU). In this connection, as described above with reference to FIG. 2, the distributed power source causes the under-reach, which results in a flow of a current value smaller than an original value (for example, 70 A) of the faulty-current $I_{source\_Flt}$. For this reason, the SV-remote terminal unit (SV-RTU) 500 should detect a current at a position where the under-reach does not occur. That is, the SV-remote terminal unit 500 should detect the current in a location of the electric line as located downstream a node where the power supplied by the power supply 10 and the power supplied by the distributed generation (DG) 20 are merged with each other. Therefore, the current value a detected by the SV-remote terminal unit (SV-RTU) 500 may be detected at a position where the under-reach does not occur. Thus, the SV-RTU 500 may detect the original faulty-current $I_{source\_Flt}$ value.

Further, each of the first directional over-current ground relay (DOCGR) 400a, the second directional over-current ground relay (DOCGR) 400b, and the third directional over-current ground relay (DOCGR) 400c may check information about the location of the corresponding electric line in the SV signal as transmitted from the SV-remote terminal unit (SV-RTU) 500. Accordingly, each of the first directional over-current ground relay (DOCGR) 400a, the second directional over-current ground relay (DOCGR) 400b, and the third directional over-current ground relay (DOCGR) 400c may use information on a direction of the detected current to identify an area to be protected.

Thus, each of the first directional over-current ground relay (DOCGR) 400a, the second directional over-current ground relay (DOCGR) 400b and the third directional over-current ground relay (DOCGR) 400c may trip the circuit breaker (CB) located in the to-be-protected area to perform the turn-off operation.

Figure 4:
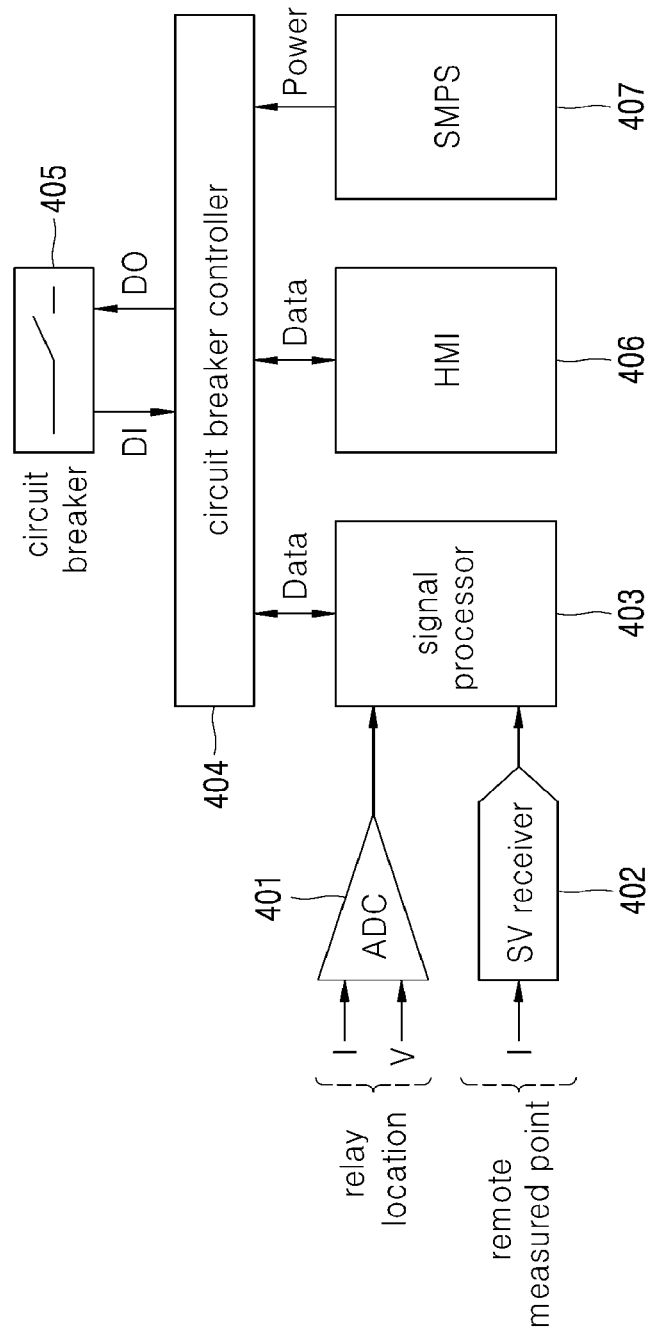
FIG. 4 is a configuration diagram detailing a configuration of the DOCGR in FIG. 3.

FIG. 4 is a configuration diagram detailing the configuration of the directional over-current ground relay (DOCGR) in FIG. 3.

The first directional over-current ground relay (DOCGR) 400a, the second directional over-current ground relay (DOCGR) 400b and the third directional over-current ground relay (DOCGR) 400c have the same configuration.

As shown in FIG. 4, each directional over-current ground relay (DOCGR) includes an ADC (Analog to Digital Converter) 401 that converts a voltage value and current value measured at a corresponding electric-line to a digital signal; a SV receiver 402 for receiving an SV signal from the SV-remote terminal unit (SV-RTU) 500; a signal processor 403 for performing a directional over-current ground relay (DOCGR) operation based on the digital signal converted by the ADC (Analog to Digital Converter) 401 and the SV signal received from the SV-remote terminal unit (SV-RTU) 500 and thus for detecting a fault direction in the corresponding electric line; and a circuit breaker controller 404 for detecting a to-be-protected area based on the fault direction in the electric line detected by the signal processor 403 and for controlling a circuit breaker 405 located in the to-be-protected area.

In this connection, the fault direction in the electric line is detected such that a measured location of the electric line is directed to the connected load when the location of the line indicated by the SV signal is associated with a location of a corresponding directional over-current ground relay (DOCGR).

In addition, the directional over-current ground relay (DOCGR) function is not limited to ground fault detection and protection. The directional over-current ground relay (DOCGR) function may also be applied to short-circuit fault detection and protection.

Further, the directional over-current ground relay (DOCGR) may further include an HMI (Human Machine Interface) 406 that receives physical process command changes, such as a set value change or a measured value change from a computer on the network, and a Switched Mode Power Supply (SMPS) 407 for supplying required power to the relay (DOCGR).

In this way, the directional over-current ground relay (DOCGR) detects a faulty-current value at a location where the under-reach does not occur and determines the presence or absence of a fault based on the detected value. This may eliminate the adverse effects of the under-reach. This may prevent malfunction or incorrect non-tripping of the directional over-current ground relay (DOCGR). Since there is only communication between the SV-RTU 500 and the directional over-current ground relay (DOCGR) that transmits the SV signal including the current value, without communications between the directional over-current ground relays (DOCGR), the problems otherwise caused by communications between the directional over-current ground relays (DOCGR) may be healed.

A method for operating the directional over-current ground relay (DOCGR) DOCGR using the sampled value (SV) according to the present disclosure will be described in detail below with reference to the accompanying drawings. In FIG. 3 and FIG. 4, the same reference numerals refer to the same components that perform the same function.

Figure 5:
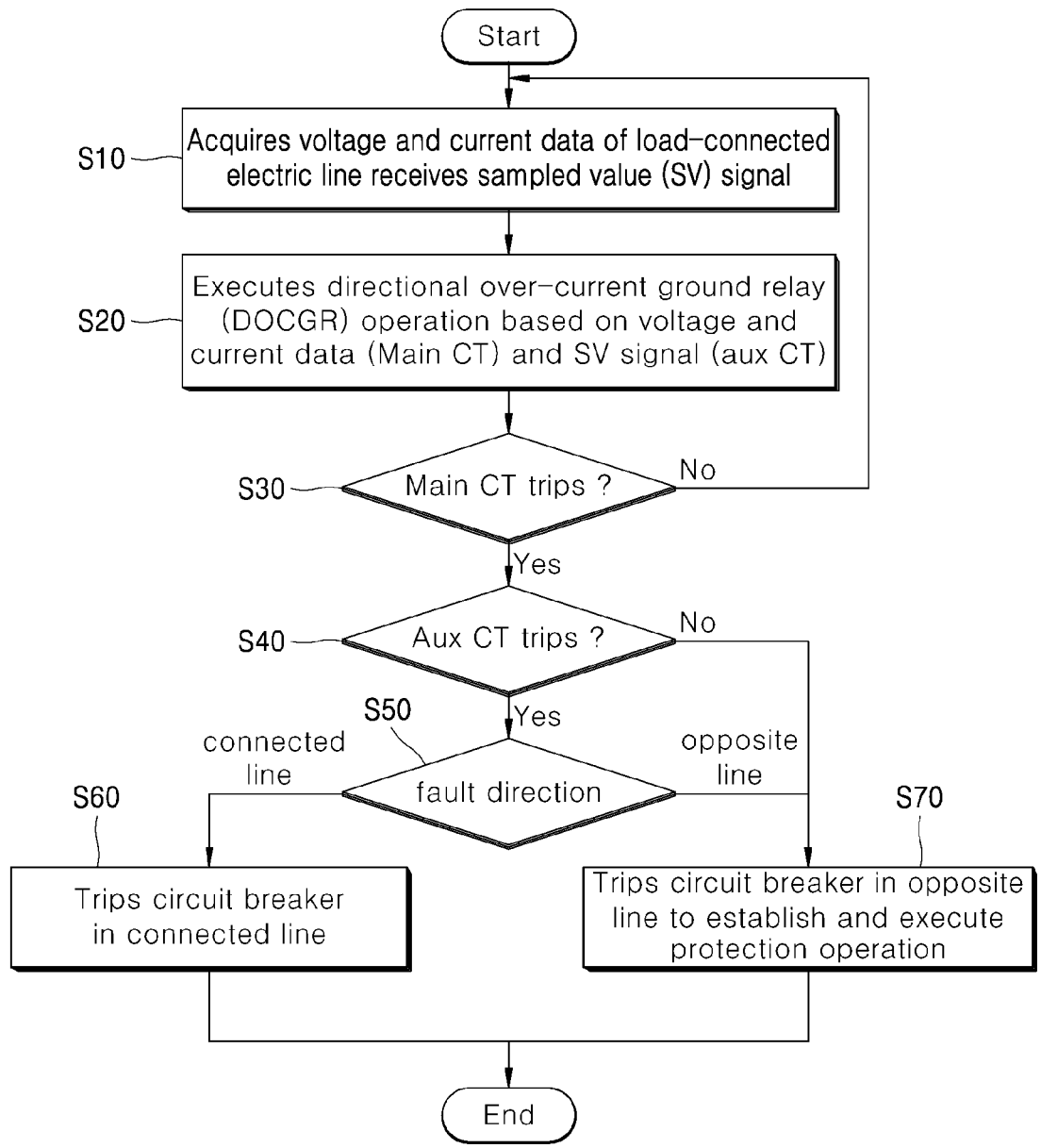
FIG. 5 is a flow chart illustrating a method for operating the directional over-current ground relay (DOCGR) using a sampled value (SV) according to one embodiment of the present disclosure.

FIG. 5 is a flow chart for illustrating a method for operating the directional over-current ground relay (DOCGR) using the sampled-value (SV) according to one embodiment of the present disclosure.

In FIG. 5, the directional over-current ground relay (DOCGR) acquires the voltage and current data of the load-connected electric line connected thereto, and receives a sampled value (SV) signal including the current data and location information as detected by the SV-RTU 500 from the unit 500 (S10).

In this connection, the directional over-current ground relay (DOCGR) may be the directional over-current ground relay (DOCGR) located between the distributed generation (DG) 200 and the load connected to the electric-line. For example, the directional over-current ground relay (DOCGR) refers to the third directional over-current ground relay (DOCGR) 400c in FIG. 3.

In addition, the SV-RTU 500 must detect the current in the electric line downstream of the node where the power supplied by the power supply 10 and the power supplied by the distributed generation (DG) 20 are combined each other. Accordingly, the current value detected by the SV-remote terminal unit (SV-RTU) 500 is detected at a location where the under-reach does not occur. Thus, the SV-RTU 500 may detect the original faulty-current $I_{source\_Flt}$ value. Further, the SV-remote terminal unit (SV-RTU) 500 generates the sampled value (SV) signal including the detected current data and information on the location of the corresponding electric line, and sends the SV signal to the directional over-current ground relay (DOCGR).

Then, the directional over-current ground relay (DOCGR) may execute the directional over-current ground relay (DOCGR) operation using the signal processor 403 based on the voltage and current data (Main CT) and the SV signal (aux CT) of the electric line as obtained (S20). In this connection, the DOCGR operation is an example and the present disclosure is not limited thereto. Hereinafter, a configuration in which the absence or presence of a fault in the electric line is determined by performing the DOCGR operation will be described for ease of illustration.

If it is determined that the detected electric line is in the normal state based on the computing result by the processor based on the obtained voltage and current data (Main CT) of the electric line (S30), the process of acquiring the voltage and current data of the load-connected electric line connected thereto is repeated (S10).

That is, if the current detected in the corresponding electric line is lower than the faulty-current, it is determined that the detected electric line is in a normal state. In this connection, as the directional over-current ground relay (DOCGR) is located upstream of the distributed generation (DG) 200 where the under-reach does not occur, an event when a current having a current value (for example, 70 A) smaller than the original faulty-current $I_{source\_Flt}$ due to the under-reach does not occur. Thus, if the detected current is lower than the faulty-current, the detected electric line may be determined to be in a normal state.

Furthermore, when the detected electric line is determined to be in a fault state, based on the calculation result (S30) of the processor of the DOCGR based on the acquired voltage and current data (Main CT) of the electric line, the DOCGR analyzes the calculation result of the processor of the DOCGR based on the SV signal (aux CT) (S40). That is, when the current measured in the detected electric line is higher than the faulty-current, it is determined that the detected electric line is in a fault state.

When it is determined that the electric line corresponding to the SV signal is in the normal state based on the calculation result (S40) by the DOCGR based on the SV signal (aux CT), the directional over-current ground relay (DOCGR) determines that the fault does not occur in the to-be-protected area at step S70. However, if a fault occurs in this system, the directional over-current ground relay (DOCGR) implements appropriate protection measures. For reference, when the electric line corresponding to the SV signal is in a normal state, the electric-line is in a normal state. Therefore, the protection operation by the directional over-current ground relay (DOCGR) becomes unnecessary.

In one embodiment, when the electric line corresponding to the SV signal is in a fault state, based on the calculation result (S40) by the DOCGR based on the SV signal (aux CT), the fault direction is determined (S50). That is, if the measured current in the detected electric line is higher than the faulty-current, it is determined that the detected electric line is in a fault state.

In this connection, the current value detected by the SV-RTU 500 is detected at a location where the under-reach does not occur. Thus, a flow of a current with a current value (e.g., 70 A) smaller than the original faulty-current $I_{source\_Flt}$ will not occur.

In this connection, the fault direction in the electric line is detected such that a measured location of the electric line is directed to the connected load when the location of the line indicated by the SV signal is associated with a location of a corresponding directional over-current ground relay (DOCGR).

Thus, if it is determined based on the fault direction determination result (S50), that the fault location is located within the electric-line, the fault has occurred in the area to be protected by the directional over-current ground relay (DOCGR). In response, the directional over-current ground relay (DOCGR) uses the circuit breaker controller 404 to trip the circuit breaker to perform a turn-off operation (S60).

On the other hand, if it is determined based on the fault direction determination result (S50) that the fault location is located in the opposite electric line, the directional over-current ground relay (DOCGR) determines that the fault does not occur in the area to be protected (S70). However, if it is determined that a fault has occurred in the system, the directional over-current ground relay (DOCGR) may establish and execute a suitable protection operation. For example, the directional over-current ground relay (DOCGR) connected to the opposite electric line to which the fault direction is directed trips the corresponding circuit breaker to perform a turn-off operation.

Figure 6:
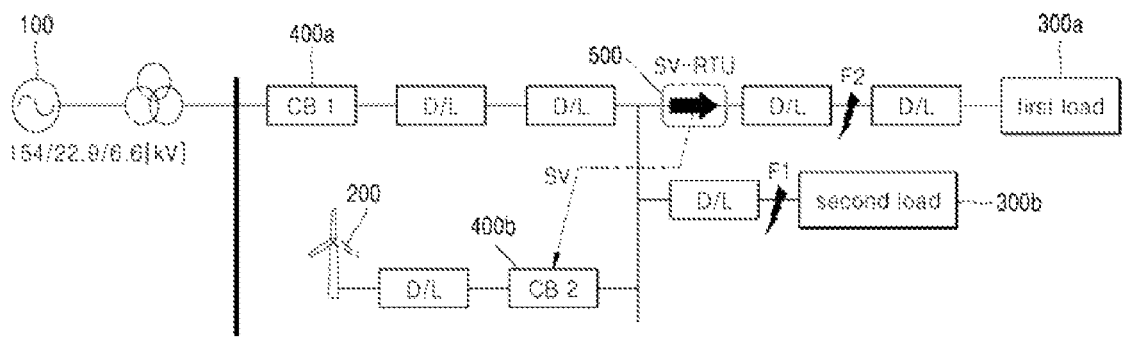
FIG. 6 is a block diagram illustrating an operation of a distributed power source system having the directional over-current ground relay (DOCGR) with the sampled value (SV) according to one embodiment of the present disclosure.

FIG. 6 is a block diagram illustrating the operation of a distributed power source system with a directional over-current ground relay (DOCGR) using a sampled-value (SV) according to one embodiment of the present disclosure.

Referring to FIG. 6, when short-circuit or ground fault occurs on the electric line to the first load 300*a* (F2), the second directional over-current ground relay (DOCGR) 400*b* obtains the voltage and current data of the electric line to the first load 300*a* connected thereto. Further, the relay 400*b* receives an SV (Sampled Value) signal including current data and location information as detected by the SV-RTU 500.

In FIG. 6, the first directional over-current ground relay (DOCGR) 400*a* and the SV-RTU 500 are electrically connected using Data Link (D/L). In addition, the SV-RTU 500 and first load 300*a* are also electrically connected using Data Link (D/L). In addition, the distributed generation (DG) 200 and the second directional over-current ground relay (DOCGR) 400*b* are also electrically connected using Data Link (D/L).

Then, the second directional over-current ground relay (DOCGR) 400*b* uses the signal processor 403 to execute the DOCGR operation based on the acquired voltage and current data (Main CT) and SV signal (aux CT).

If it is determined based on the calculation result by the DOCGR based on the voltage and current data (Main CT) of the electric line that the detected electric line is in the fault state, the second directional over-current ground relay (DOCGR) 400*b* analyzes the calculation result by the DOCGR based on the SV signal (aux CT).

Further, if it is determined based on the calculation result (S40) by the DOCGR using the SV signal (aux CT) that the electric line corresponding to the SV signal is in a fault state, the second directional over-current ground relay (DOCGR) determines the fault direction. Since the determination that the fault direction is directed to the electric-line is made based on the fault direction determination result, the second directional over-current ground relay (DOCGR) 400*b* determines that the fault has occurred in the area it needs to protect. Accordingly, the second directional over-current ground relay (DOCGR) 400*b* uses the circuit breaker controller 404 to trip the circuit breaker to perform a turn-off operation.

When short-circuit or ground fault occurs in the electric line to the second load 300*b* (F1), the second directional over-current ground relay (DOCGR) 400*b* acquires the voltage and current data of the electric line to the second load 300*b* connected thereto. In addition, the relay 400*b* receives an SV (Sampled Value) signal including current data and location information as detected by the SV-RTU 500.

The second directional over-current ground relay (DOCGR) may use the signal processor 403 to execute the directional over-current ground relay operation based on the obtained voltage and current data (Main CT) and SV signal (aux CT) of the electric line.

If it is determined from the calculation result by DOCGR based on the voltage and current data (Main CT) of the electric line that the detected electric line is in a fault state, the second directional over-current ground relay (DOCGR) 400*b* analyzes the calculation result by the DOCGR based on the SV signal (aux CT).

Furthermore, if it is determined from the calculation result (S40) by the DOCGR based on the SV signal (aux CT) that the electric line corresponding to the SV signal is in the normal state, the second directional over-current ground relay (DOCGR) 400*b* determines that the fault does not occur in the area to be protected.

However, if it is determined that a fault has occurred in the system, the second directional over-current ground relay (DOCGR) 400*b* establishes and executes an appropriate protection operation. For example, the first directional over-current ground relay (DOCGR) 400*a* coupled to the opposite electric line to which the fault direction is directed may trip the corresponding circuit breaker to perform a turn-off operation.

In the above description, numerous specific details are set forth in order to provide a thorough understanding of the present disclosure. The present disclosure may be practiced without some or all of these specific details. Examples of various embodiments have been illustrated and described above. It will be understood that the description herein is not intended to limit the claims to the specific embodiments described. On the contrary, it is intended to cover alternatives, modifications, and equivalents as may be included within the spirit and scope of the present disclosure as defined by the appended claims.

What is claimed is:

1. A distributed power source system comprising:
a power supply for supplying power;
a distributed generation (DG) for supplying generated-power using distributed power sources connected to a power grid;
a plurality of loads for consuming power supplied from the power supply and the distributed generation (DG);
a plurality of directional over-current ground relays (DOCGRs) provided between the power supply and the distributed generation (DG) and using a sampled value (SV) signal, wherein each of the plurality of directional over-current ground relays (DOCGRs) trips a corresponding circuit breaker (CB) to isolate a faulty section in an event of a short-circuit or ground fault in a load-connected electric line connected thereto; and a SV-remote terminal unit (SV-RTU) for detecting a current value in the load-connected electric line located between the power supply and the distributed generation (DG) and for transmitting, to the directional over-current ground relays (DOCGRs), the detected current value and information about a location of the load-connected electric line.

2. The distributed power source system of claim 1, wherein the SV-remote terminal unit (SV-RTU) transmits the SV signal to the directional over-current ground relays (DOCGRs) using optical communication.

3. The distributed power source system of claim 1, wherein at least one SV-remote terminal unit (SV-RTU) is disposed between the plurality of loads and the plurality of directional over-current ground relays (DOCGRs), wherein the SV-RTU detects the value of current flowing in a corresponding electric line connected thereto, and generates the SV signal including the detected current value and information about a location of the corresponding electric line, and delivers the SV signal to all of the directional over-current ground relays (DOCGRs).

4. The distributed power source system of claim 1, wherein the SV-remote terminal unit (SV-RTU) detects the current in a location of the corresponding electric line located downstream a node where power supplied by the power supply and power supplied by the distributed generation (DG) are merged with each other.

5. The distributed power source system of claim 1, wherein each of the directional over-current ground relays (DOCGRs) includes:
   an analog to digital converter (ADC) for converting, to a digital signal, a voltage value and current value measured at an electric-line connected to each directional over-current ground relay (DOCGR);
   a sampled value (SV) receiver 402 for receiving the SV signal from the SV-remote terminal unit (SV-RTU);
   a signal processor for performing a directional over-current ground relay (DOCGR) operation based on the digital signal converted from the ADC and the SV signal received from the SV-remote terminal unit (SV-RTU) and for detecting a fault direction in the electric line; and
   a circuit breaker controller for detecting a to-be-protected area based on the detected fault direction in the electric line detected by the signal processor and for controlling the circuit breaker located in the detected to-be-protected area.

6. The distributed power source system of claim 5, wherein the fault direction in the electric line is detected such that a measured location of the electric line is directed to the connected load when the location of the line indicated by the SV signal is associated with a location of the corresponding directional over-current ground relay (DOCGR).

7. A method for operating a directional over-current ground relay (DOCGR) using a sampled value, the method comprising:
   (a) acquiring voltage and current data in a load-connected electric line to the DOCGR, and receiving a sampled value (SV) signal including current data and location information detected by a SV-RTU;
   (b) using a signal processor to perform a DOCGR (Directional Over-current Ground Relay) operation based on the acquired voltage and current data (Main CT) in the electric line and the received SV signal (aux CT);
   (c) when it is determined from a calculation result by the signal processor based on the acquired voltage and current data (Main CT) that the electric line is in a fault state, determining a calculation result by the signal processor based on the SV signal (aux CT);
   (d) when it is determined from the calculation result by the signal processor based on the SV signal (for aux CT) that an electric line exhibiting the SV signal is in a fault state, determining a fault direction;
   (e) when it is determined from the fault direction determination result that the fault direction is directed to the load-connected electric-line, using a circuit breaker controller to trip a circuit breaker; and
   (f) when it is determined from the fault direction determination result that the fault direction is directed to an electric line opposite the load-connected electric-line, determining that a fault does not occur in an area to be protected by the directional over-current ground relay (DOCGR).

8. The method of claim 7, wherein in (a), the SV-remote terminal unit detects a current in a location of the electric line located downstream a node where power supplied by a power supply and power supplied by a distributed generation (DG) are merged with each other.

9. The method of claim 7, wherein the method further comprises: when it is determined from the calculation result by the signal processor based on the SV signal (aux CT) that the electric line corresponding to the SV signal is in the normal state, determining that no fault occurs in the area to be protected by the directional over-current ground relay (DOCGR).

10. The method of claim 7, wherein in (d), the fault direction in the electric line is detected such that a measured location of the electric line is directed to the connected load when the location of the line indicated by the SV signal is associated with a location of a corresponding directional over-current ground relay (DOCGR).

11. The method of claim 7, wherein (f) includes controlling a directional over-current ground relay (DOCGR) connected to the opposite electric line to trip a corresponding circuit breaker to perform a turn-off operation thereof.

* * * * *